(12) United States Patent
Lee

(10) Patent No.: US 11,501,414 B2
(45) Date of Patent: Nov. 15, 2022

(54) DEBANDING DETERMINATION METHOD FOR IMAGE AND DEBANDING DETERMINATION CIRCUIT THEREOF

(71) Applicant: REALTEK SEMICONDUCTOR CORP., Hsinchu (TW)

(72) Inventor: Kung-Ho Lee, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 181 days.

(21) Appl. No.: 17/124,727

(22) Filed: Dec. 17, 2020

(65) Prior Publication Data

US 2022/0020121 A1 Jan. 20, 2022

(30) Foreign Application Priority Data

Jul. 14, 2020 (TW) .................................. 109123787

(51) Int. Cl.
*G06T 5/00* (2006.01)
*G06T 7/00* (2017.01)
*G06T 7/90* (2017.01)

(52) U.S. Cl.
CPC ............ *G06T 5/002* (2013.01); *G06T 7/0002* (2013.01); *G06T 7/90* (2017.01); *G06T 2207/30168* (2013.01)

(58) Field of Classification Search
CPC ......... G06T 5/002; G06T 7/0002; G06T 7/90; G06T 2207/30168; G06T 2207/10024; G06T 5/20; H04N 9/646

USPC ......................................................... 382/167
See application file for complete search history.

(56) References Cited

U.S. PATENT DOCUMENTS

| | | | | |
|---|---|---|---|---|
| 9,311,688 | B1* | 4/2016 | Rosenberg | ................ G06T 1/20 |
| 2009/0304270 | A1* | 12/2009 | Bhagavathy | ........... H04N 1/409 |
| | | | | 382/162 |
| 2010/0142808 | A1* | 6/2010 | Bhagavat | ............... H04N 1/409 |
| | | | | 382/165 |
| 2016/0307302 | A1* | 10/2016 | Chou | ...................... G06T 5/002 |
| 2019/0286115 | A1* | 9/2019 | Wang | ..................... G06T 7/001 |

* cited by examiner

*Primary Examiner* — Ali Bayat
(74) *Attorney, Agent, or Firm* — Birch, Stewart, Kolasch & Birch, LLP

(57) ABSTRACT

A debanding determination method for an image and a debanding determination circuit thereof are provided. The method includes: calculating change amounts between color components respectively corresponding to a start pixel, an end pixel, and at least one intermediate pixel in a plurality of pixels of the image; adjusting the change amounts according to weight values corresponding to the color components, and calculating a weighted total change amount according to the adjusted change amounts; calculating change counts between the color components of the start pixel, the end pixel, and the at least one intermediate pixel; and determining whether to perform debanding compensation on each of the color components of the start pixel by using the end pixel as a reference pixel.

18 Claims, 7 Drawing Sheets

DEBANDING DETERMINATION METHOD FOR IMAGE AND DEBANDING DETERMINATION CIRCUIT THEREOF

CROSS-REFERENCE TO RELATED APPLICATION

This non-provisional application claims priority under 35 U.S.C. § 119(a) to Patent Application No. 109123787 in Taiwan, R.O.C. on Jul. 14, 2020, the entire contents of which are hereby incorporated by reference.

BACKGROUND

Technical Field

The present invention relates to a debanding determination method for an image and a debanding determination circuit thereof.

Related Art

In a conventional image processing technology, in order to produce a low-capacity image, some color details are often omitted in quantization and encoding programs of image processing or the image is compressed to produce a low-capacity image. However, due to the reduction of some color details, color bands are often generated on the low-capacity image. In other words, abnormal color gamut boundaries can be found on such images, and especially on blocks corresponding to the same color, the color gamut boundaries can be observed more clearly. Therefore, definition of the image is reduced sharply. Therefore, it is important to determine whether the image produces the color bands to eliminate the color bands.

SUMMARY

In some embodiments, a debanding determination method for an image includes: calculating a first change amount between first color components respectively corresponding to a start pixel, an end pixel, and at least one intermediate pixel in a plurality of pixels of the image, where the at least one intermediate pixel is located between the start pixel and the end pixel on the image; calculating a second change amount between second color components respectively corresponding to the start pixel, the end pixel, and the at least one intermediate pixel; calculating a third change amount between third color components respectively corresponding to the start pixel, the end pixel, and the at least one intermediate pixel; adjusting the first change amount according to a first weight value corresponding to the first color component, adjusting the second change amount according to a second weight value corresponding to the second color component, and adjusting the third change amount according to a third weight value corresponding to the third color component, to calculate a weighted total change amount according to the adjusted first change amount, the adjusted second change amount, and the adjusted third change amount; calculating a first change count between the first color components respectively corresponding to the start pixel, the end pixel, and the at least one intermediate pixel; calculating a second change count between the second color components respectively corresponding to the start pixel, the end pixel, and the at least one intermediate pixel; calculating a third change count between the third color components respectively corresponding to the start pixel, the end pixel, and the at least one intermediate pixel; and determining whether to perform debanding compensation on the first color component, the second color component, or the third color component of the start pixel by using the end pixel as a reference pixel, according to the weighted total change amount and a predetermined weighted value corresponding to the weighted total change amount, the first change amount and a first predetermined amount value corresponding to the first change amount, the second change amount and a second predetermined amount value corresponding to the second change amount, the third change amount and a third predetermined amount value corresponding to the third change amount, the first change count and a first predetermined change count value corresponding to the first change count, the second change count and a second predetermined change count value corresponding to the second change count, and the third change count and a third predetermined change count value corresponding to the third change count. When the first color component corresponds to brightness or green, the second color component corresponds to red chroma or red, and the third color component corresponds to blue chroma or blue, the first weight value is greater than or equal to the second weight value, the second weight value is greater than or equal to the third weight value, and a sum of the second weight value and the third weight value is greater than or equal to the first weight value.

In some embodiments, a debanding determination circuit for an image includes a first operation circuit, a second operation circuit, a third operation circuit, and a processing circuit. The first operation circuit calculates a first change amount between first color components respectively corresponding to a start pixel, an end pixel, and at least one intermediate pixel in a plurality of pixels of an image, calculates a second change amount between second color components respectively corresponding to the start pixel, the end pixel, and the at least one intermediate pixel, and calculates a third change amount between third color components respectively corresponding to the start pixel, the end pixel, and the at least one intermediate. The intermediate pixel is located between the start pixel and the end pixel. The second operation circuit adjusts the first change amount according to a first weight value corresponding to the first color component, adjusts the second change amount according to a second weight value corresponding to the second color component, and adjusts the third change amount according to a third weight value corresponding to the third color component, to calculate a weighted total change amount according to the adjusted first change amount, the adjusted second change amount, and the adjusted third change amount. When the first color component corresponds to brightness or green, the second color component corresponds to red chroma or red, and the third color component corresponds to blue chroma or blue, the first weight is greater than or equal to the second weight, the second weight is greater than or equal to the third weight, and a sum of the second weight and the third weight is greater than or equal to the first weight. The third operation circuit calculates a first change count between the first color components respectively corresponding to the start pixel, the end pixel, and the at least one intermediate pixel, calculates a second change count between the second color components respectively corresponding to the start pixel, the end pixel, and the at least one intermediate pixel, and calculates a third change count between the third color components respectively corresponding to the start pixel, the end pixel, and the at least one intermediate pixel. The processing circuit determines whether to perform debanding compensation on the first color component, the second color component, or the third color component of the start pixel by using the end pixel as a reference pixel, according to the weighted total change amount and a predetermined weighted value corresponding to the weighted total change amount, the first change amount and a first predetermined amount value corresponding to the first change amount, the second change amount and a second predetermined amount value corresponding to the second change amount, the third change amount and a third predetermined amount value corresponding to the third change amount, the first change count and a first predetermined change count value corresponding to the first change count, the second change count and a second predetermined change count value corresponding to the second change count, and the third change count and a third predetermined change count value corresponding to the third change count.

DETAILED DESCRIPTION

Figure 1:
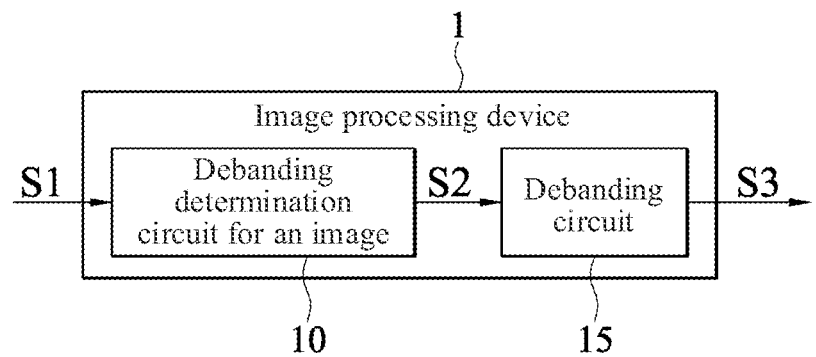
FIG. 1 is a circuit block diagram of an embodiment of an image processing device applying a debanding determination circuit for an image according to the present invention.
Figure 2:
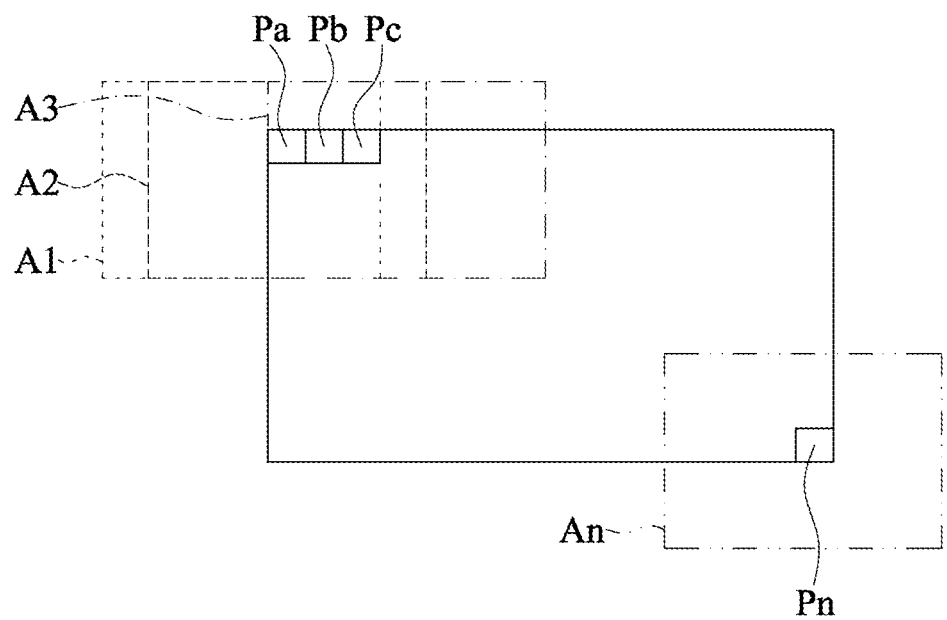
FIG. 2 is a schematic diagram of an embodiment of a plurality of pixels and a plurality of predetermined operation areas included in a picture corresponding to an input image signal.

FIG. 1 is a circuit block diagram of an embodiment of an image processing device 1 applying a debanding determination circuit 10 for an image according to the present invention. FIG. 2 is a schematic diagram of an embodiment of a plurality of pixels Pa-Pn and a plurality of predetermined operation areas A1-An included in a picture corresponding to an input image signal S1. Referring to both FIG. 1 and FIG. 2, the debanding determination circuit 10 for an image may receive the input image signal S1, and the debanding determination circuit 10 for an image may determine whether to perform debanding compensation on the pixels Pa-Pn of the input image signal S1. The debanding determination circuit 10 for an image may divide the input image signal S1 into a plurality of predetermined operation areas A1-An by using pixels Pa-Pn as centers. A size of the predetermined operation areas A1-An is adjustable. The debanding determination circuit 10 for an image determines, by using the pixels Pa-Pn as a benchmark, whether color bands (or color gamut boundaries) are generated in the respective predetermined operation areas A1-An and a range of the generated color bands, and then performs debanding compensation on the pixels Pa-Pn. For example, as shown in FIG. 2, the debanding determination circuit 10 for an image may determine, based on a predetermined operation area A1 centered on a pixel Pa, whether to perform debanding compensation on the pixel Pa. The debanding determination circuit 10 for an image determines, based on a predetermined operation area A2 centered on a pixel Pb, whether to perform debanding compensation on the pixel Pb. The debanding determination circuit 10 for an image determines, based on a predetermined operation area A3 centered on a pixel Pc, whether to perform debanding compensation on the pixel Pc. The other compensation determination can be done in the same manner and is not repeated herein again.

Figure 3:
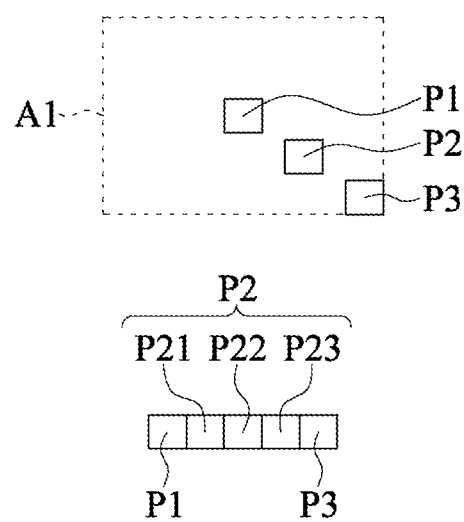
FIG. 3 is a schematic diagram of an embodiment of a plurality of pixels included in one of the predetermined operation areas in FIG. 2.

When it is determined whether to perform an operational program of debanding compensation needs on a central pixel of predetermined operation areas A1-An, the debanding determination circuit 10 executes such determination according to color components of the central pixels and color components of a plurality of adjacent pixels. For example, as shown in FIG. 3, for example, the central pixel included in the predetermined operation area A1 is used as the start pixel P1, a plurality of adjacent pixels of the start pixel P1 may include at least one intermediate pixel P2 (only one intermediate pixel P2 is used as an example in FIG. 3, but the present invention is not limited thereto, and there may be more than one intermediate pixels P2) on a virtual straight line passing through the start pixel P1 and the end pixel P3. There may be any included angle between the foregoing virtual straight line and a horizontal direction extending from the start pixel P1, so that the end pixel P3 is located at any position within a limited range around the start pixel P1, and the intermediate pixel P2 is located between the start pixel P1 and the end pixel P3.

The debanding determination circuit 10 for an image determines, according to the color components of the start pixel P1, the intermediate pixel P2, and the end pixel P3, whether the end pixel P3 may be used as a reference pixel for debanding compensation on color components of the start pixel P1. In other words, by using the start pixel P1 as a benchmark, the debanding determination circuit 10 for an image may search for a plurality of pixels along at least one direction (for example, a horizontal direction, a vertical direction, and an inclined direction, etc.) according to specific conditions (that is, a relationship between the color components of the start pixel P1, the intermediate pixel P2, and the end pixel P3) in the predetermined operation area A1, and eventually find an end pixel P3 in the direction. The end pixel P3 may be used as a reference pixel for debanding compensation on the start pixel P1.

It is understood that if there are a plurality of pixel points that conform to conditions as reference pixels within a sampling range (for example a predetermined operation area A1 to which the start pixel P1 belongs), along a direction from the start pixel P1 to a currently selected end pixel P3 (referred to as candidate end pixels herein), the debanding determination circuit 10 for an image selects only one of the candidate end pixels as the end pixel P3. In some embodiments, the debanding determination circuit 10 for an image selects a candidate end pixel that is the farthest (for example, Euclidean distance) from the start pixel P1 among the candidate end pixels as the selected end pixel P3.

Figure 4:
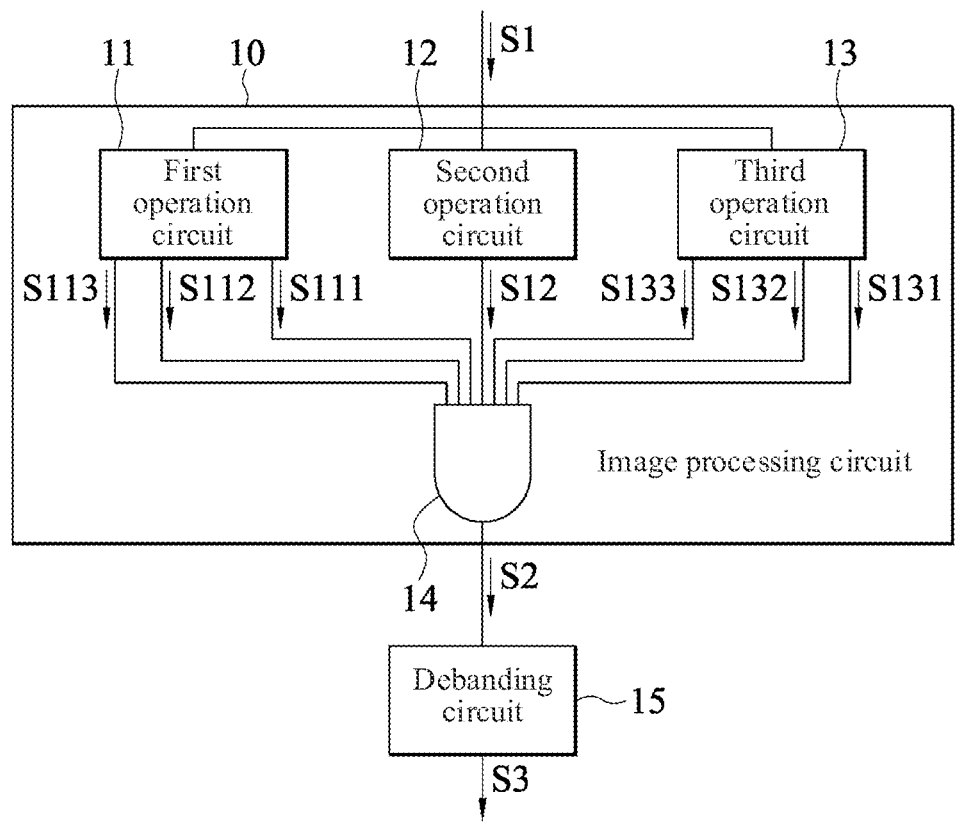
FIG. 4 is a circuit diagram of an embodiment of a debanding determination circuit for an image according to the present invention.
Figure 5A:
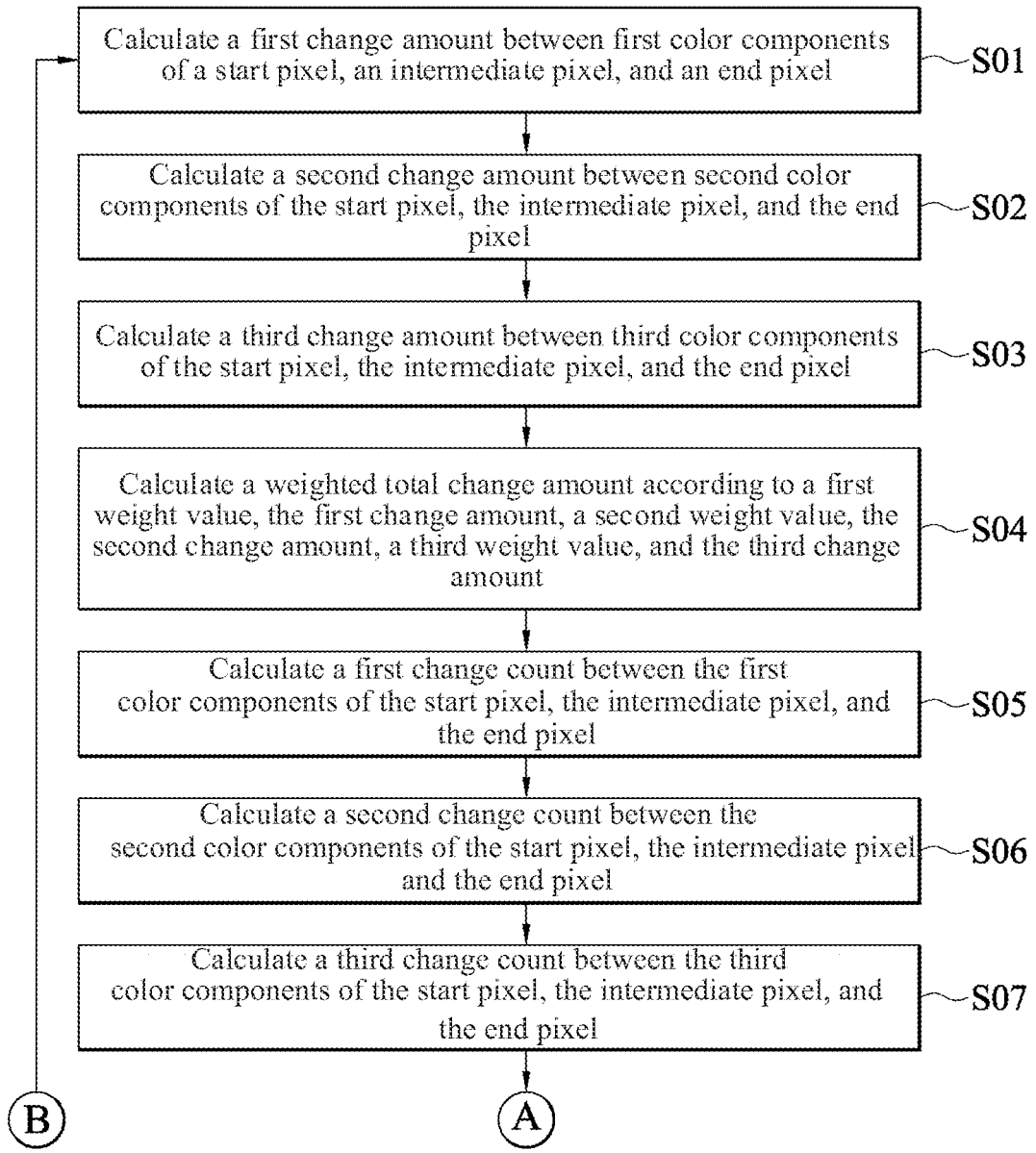
FIG. 5A and FIG. 5B are flowcharts of an embodiment of a debanding determination method for an image according to the present invention.
Figure 5B:
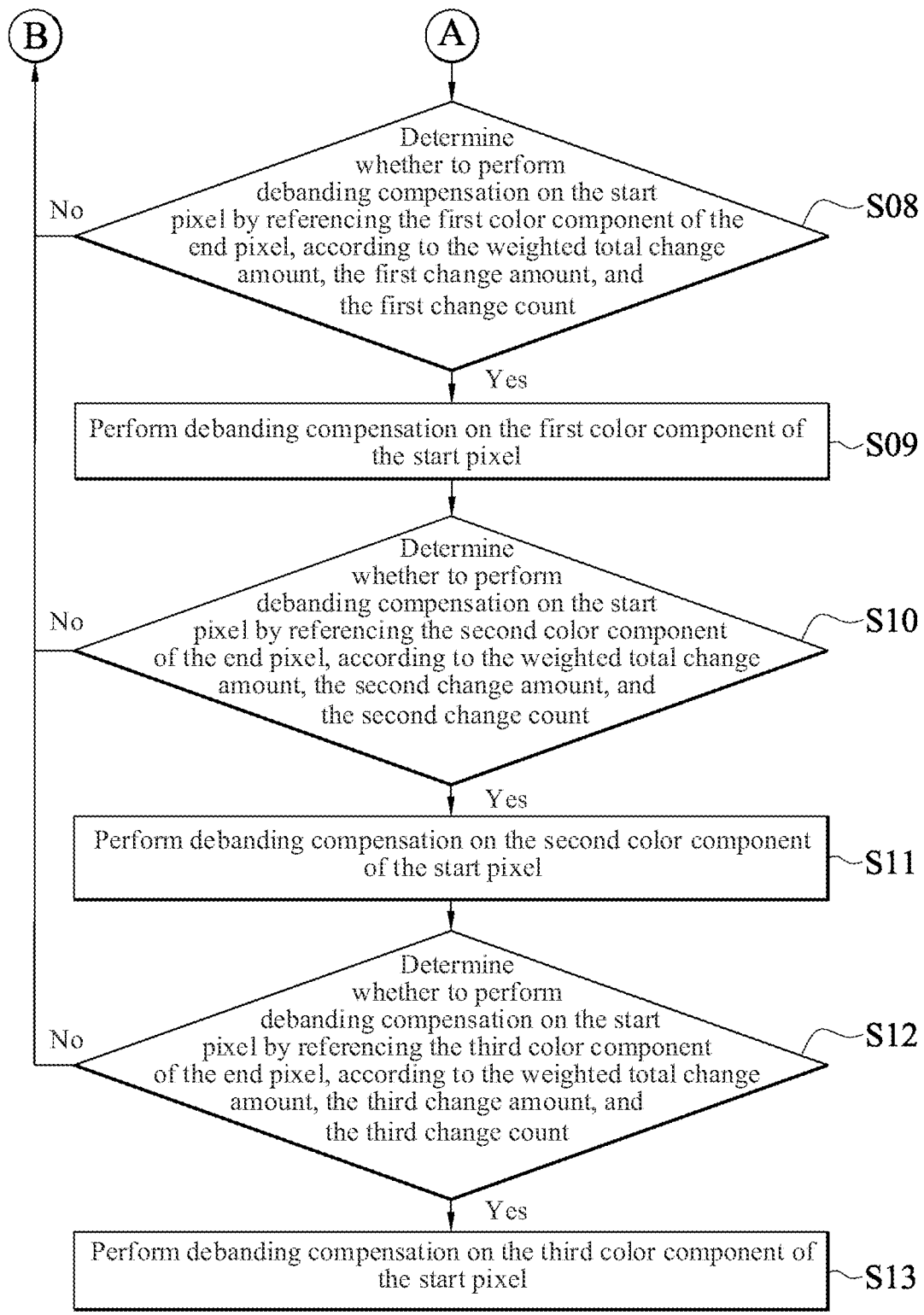

In detail, referring to FIG. 4, FIG. 5A, and FIG. 5B, the debanding determination circuit 10 for an image includes a first operation circuit 11, a second operation circuit 12, a third operation circuit 13, and a processing circuit 14. The processing circuit 14 is coupled to the first operation circuit 11, the second operation circuit 12 and the third operation circuit 13. According to different color components (hereinafter referred to as the first color components, the second color components, and the third color components) of the start pixel P1, the first operation circuit 11 calculates a change amount (hereinafter referred to as a first change amount) between the first color components of the start pixel P1, an intermediate pixel P2, and an end pixel P3 (step S01), and calculates a change amount (hereinafter referred to as a second change amount) between the second color components of the start pixel P1, the intermediate pixel P2, and the end pixel P3 (step S02), and the first operation circuit 11 calculates a change amount (hereinafter referred to as a third change amount) between the third color components of the start pixel P1, the end pixel P3, and the intermediate pixels P2 (step S03). In short, a function of the first operation circuit 11 is to calculate respective change amounts between the color components of the start pixel P1, the intermediate pixel P2, and the end pixel P3.

The second operation circuit 12 adjusts the first change amount according to a first weight value corresponding to the first color component, adjusts the second change amount according to a second weight value corresponding to the second color component, and adjusts the third change amount according to a third weight value corresponding to the third color component. The second operation circuit 12 calculates a weighted total change amount according to the adjusted first change amount, the adjusted second change amount, and the adjusted third change amount (step S04). When the first color component corresponds to brightness information (Y) or green information (G), the second color component corresponds to red chroma information (Cb) or red information (R), and the third color component corresponds to blue chroma information (Cr) or blue information (B), the first weight value is greater than or equal to the second weight value, the second weight value is greater than or equal to the third weight value, and a sum of the second weight value and the third weight value is greater than or equal to the first weight value. In short, a function of the second operation circuit 12 is to calculate weighted change amounts of the plurality of color components of the start pixel P1, the intermediate pixels P2 and the end pixel P3.

The third operation circuit 13 calculates a first change count that indicates how many times the first color components corresponding to the start pixel P1, the end pixel P3 and at least one intermediate pixel P2 have changed (step S05). The third operation circuit 13 calculates a second change count that indicates how many times the second color components corresponding to the start pixel P1, the end pixel P3, and at least one intermediate pixel P2 have changed (step S06). The third operation circuit 13 calculates a count that indicates how many times the third color components corresponding to the start pixel P1, the end pixel P3, and at least one intermediate pixel P2 have changed (step S07). In short, a function of the third operation circuit 13 is to count times of changes reflected on the start pixel P1, the intermediate pixel P2 and the end pixel P3 with respect to each color component.

The processing circuit 14 may respectively determine, according to output results of the first operation circuit 11, the second operation circuit 12, and the third operation circuit 13, whether the end pixel P3 and the start pixel P1 are in the same block (color gamut boundaries caused by consecutive same/similar pixel colors) on the image. If determination result is yes, the processing circuit 14 determines that debanding compensation may be performed on the start pixel P1 by referencing the end pixel P3.

In detail, the processing circuit 14 determines whether to perform debanding compensation on the first color component of the start pixel P1 by referencing the first color component of the end pixel P3, according to a weighted total change amount output by the second operation circuit 12, a first change amount output by the first operation circuit 11, and a first change count output by the third operation circuit 13,. In other words, the processing circuit 14 determines whether the first color component of the end pixel P3 and the first color component of the start pixel P1 are in the same block on the image. If the determination result is yes, debanding compensation is performed on the first color component of the start pixel P1 by referencing the first color component of the end pixel P3 (step S08). Similarly, the processing circuit 14 determines whether to perform debanding compensation on the second color component of the start pixel P1 by referencing the second color component of the end pixel P3, according to the weighted total change amount output by the second operation circuit 12, the second change amount output by the first operation circuit 11, and the second change count output by the third operation circuit 13(step S10). In other words, the processing circuit 14 determines whether the second color component of the end pixel P3 and the second color component of the start pixel P1 are in the same block on the image. If the determination result is yes, debanding compensation is performed on the second color component of the start pixel P1 by referencing the second color component of the end pixel P3. The processing circuit 14 determines whether to perform debanding compensation on the third color component of the start pixel P1 by referencing the third color component of the end pixel P3, according to the weighted total change amount output by the second operation circuit 12, the third change amount output by the first operation circuit 11, and the third change count output by the third operation circuit 13, (step S12). In other words, the processing circuit 14 determines whether the third color component of the end pixel P3 and the third color component of the start pixel P1 are in the same block on the image. If the determination result is yes, debanding compensation may be performed on the third color component of the start pixel P1 by referencing the third color component of the end pixel P3.

The processing circuit 14 may generate a determination result S2 of "yes" or "no" to indicate whether the color components of the end pixel P3 may be used to perform debanding compensation on the color components corresponding to the start pixel P1.

In some embodiments, as shown in FIG. 1 and FIG. 4, the image processing device 1 may further include a debanding circuit 15 coupled to the processing circuit 14. The processing circuit 14 may send the foregoing determination result S2 to the debanding circuit 15. The debanding circuit 15 then determines, according to the determination result S2, to perform debanding compensation on color components of the start pixel P1 by referencing the color components of the end pixel P3.

For example, in the predetermined operation area A1 of FIG. 3, a plurality of end pixels P3 may be determined along several directions. For example, if a cross-shaped search (along up, down, left, and right) is performed by using the start pixel P1 as a center, four end pixels P3 that meet the determination result S2 may be found. The debanding circuit 15 may adjust the color components of the start pixel P1 according to color components of the start pixel P1 and a plurality of end pixels P3 in the predetermined operation area A1 in FIG. 3. As previously described, if four end pixels P3 are found in the predetermined operation area A1 with the cross-shaped search, the four end pixels P3 may define image boundaries with respect to the start pixel P1. The debanding circuit 15 may calculate a new color component of the start pixel P1 by referencing color components of the four end pixels P3 so as to eliminate the image boundaries (i.e., color bands) possibly caused by the start pixel P1.

In some embodiments, in step S08, the processing circuit 14 determines, according to a first predetermined amount value corresponding to the first color component, whether the first change amount is less than the first predetermined amount value, and the processing circuit 14 determines whether a weighted total change amount is less than a predetermined weighted value, and the processing circuit 14 determines whether a first number of times of changes is less than a first change count value. When the first change amount is less than the first predetermined amount value, the weighted total change amount is less than the predetermined weighted value, and the first change count is less than a first predetermined change count value (which may be understood as a specific threshold), that is when all determination conditions are met, the processing circuit 14 starts to generate a determination result S2 with "yes", the processing circuit 14 may send the foregoing determination result S2 to the debanding circuit 15, so that the debanding circuit 15 performs debanding compensation on the first color component of the start pixel P1 by referencing the first color component of the end pixel P3 (step S09). If any of the foregoing determination conditions is not met, the processing circuit 14 generates a determination result S2 with "No", and the processing circuit 14 sends the foregoing determination result S2 to the debanding circuit 15, so that the debanding circuit 15 does not perform debanding compensation on the first color component of the start pixel P1 by referencing the first color component of the end pixel P3. In other words, the result indicates that the first color components of the start pixel P1 and the end pixel P3 may be regarded as different blocks on the image.

Similarly, for the second color component, in step S10, the processing circuit 14 determines whether the second change amount is less than the second predetermined amount value according to a second predetermined amount value corresponding to the second color component, the processing circuit 14 determines whether the weighted total change amount is less than a predetermined weighted value, and the processing circuit 14 determines whether the second change count is less than the second predetermined change count value. When the second change amount is less than the second predetermined amount value, the weighted total change amount is less than the predetermined weighted value, and the second change count is less than the second predetermined change count value, that is when all determination conditions are met, the processing circuit 14 starts to generate a determination result S2 with "yes", and the processing circuit 14 may send the foregoing determination result S2 to the debanding circuit 15, so that the debanding circuit 15 performs debanding compensation on the second color component of the start pixel P1 by referencing the second color component of the end pixel P3 (step S11). If any of the foregoing determination conditions is not met, the processing circuit 14 generates a determination result S2 with "No", and the processing circuit 14 sends the foregoing determination result S2 to the debanding circuit 15, so that the debanding circuit 15 does not perform debanding compensation on the second color component of the start pixel P1 by referencing the second color component of the end pixel P3. In other words, the result indicates that the second color components of the start pixel P1 and the end pixel P3 may be regarded as different blocks on the image.

Similarly, for the third color component, in step S12, the processing circuit 14 determines whether a third change amount is less than a third predetermined amount value according to a third predetermine amount value corresponding to the third color component, the processing circuit 14 determines whether the weighted total change amount is less than a predetermined weighted value, and the processing circuit 14 determines whether the third change count is less than a third predetermined n change count value. When the third change amount is less than the third predetermined amount value, the weighted total change amount is less than the predetermined weighted value, and the third change count is less than the third predetermined change count value, that is, when all determination conditions are met, the processing circuit 14 starts generating a determination result S2 with "yes", and the processing circuit 14 may send the foregoing determination result S2 to the debanding circuit 15, so that the debanding circuit 15 performs debanding compensation on the third color component of the start pixel P1 by referencing the third color component of the end pixel P3 (step S13). If any of the foregoing determination conditions is not met, the processing circuit 14 generates a determination result S2 with "No", and the processing circuit 14 sends the foregoing determination result S2 to the debanding circuit 15, so that the debanding circuit 15 does not perform debanding compensation on the third color component of the start pixel P1 by referencing the third color component of the end pixel P3. In other words, the third color components of the start pixel P1 and the end pixel P3 may be regarded as different blocks on the image.

After it is determined whether to perform debanding compensation on the first color component, the second color component, and the third color component of a central pixel Pa of the predetermined operation area A1, the debanding determination circuit 10 for an image starts to perform step S01 to determine, according to a central pixel Pb located in a predetermined operation area A2 and an adjacent pixel thereof, whether to perform debanding compensation on the color components of the pixel Pb. The other cases can be done in a same manner (which may be understood as being processed in sequence along a horizontal direction) and is not repeated herein again. Until the debanding determination circuit 10 for an image determines whether to perform debanding compensation on color components of a pixel Pn in a predetermined operation area An, the debanding circuit 15 may complete the image processing procedure of the input image signal S1 and generate an output image signal S3.

Based on this, when performing debanding compensation on the central pixel, the debanding determination circuit 10 for an image may generate an image signal of better image quality in a low operation capacity by using a specific plurality of adjacent pixels (i.e., the end pixel P3) in the predetermined operation area as a reference pixel. The debanding determination circuit 10 for an image further determines the reference pixels according to the weighted total change amount of all the three color components, so that a more accurate determination result may be generated.

Figure 6A:
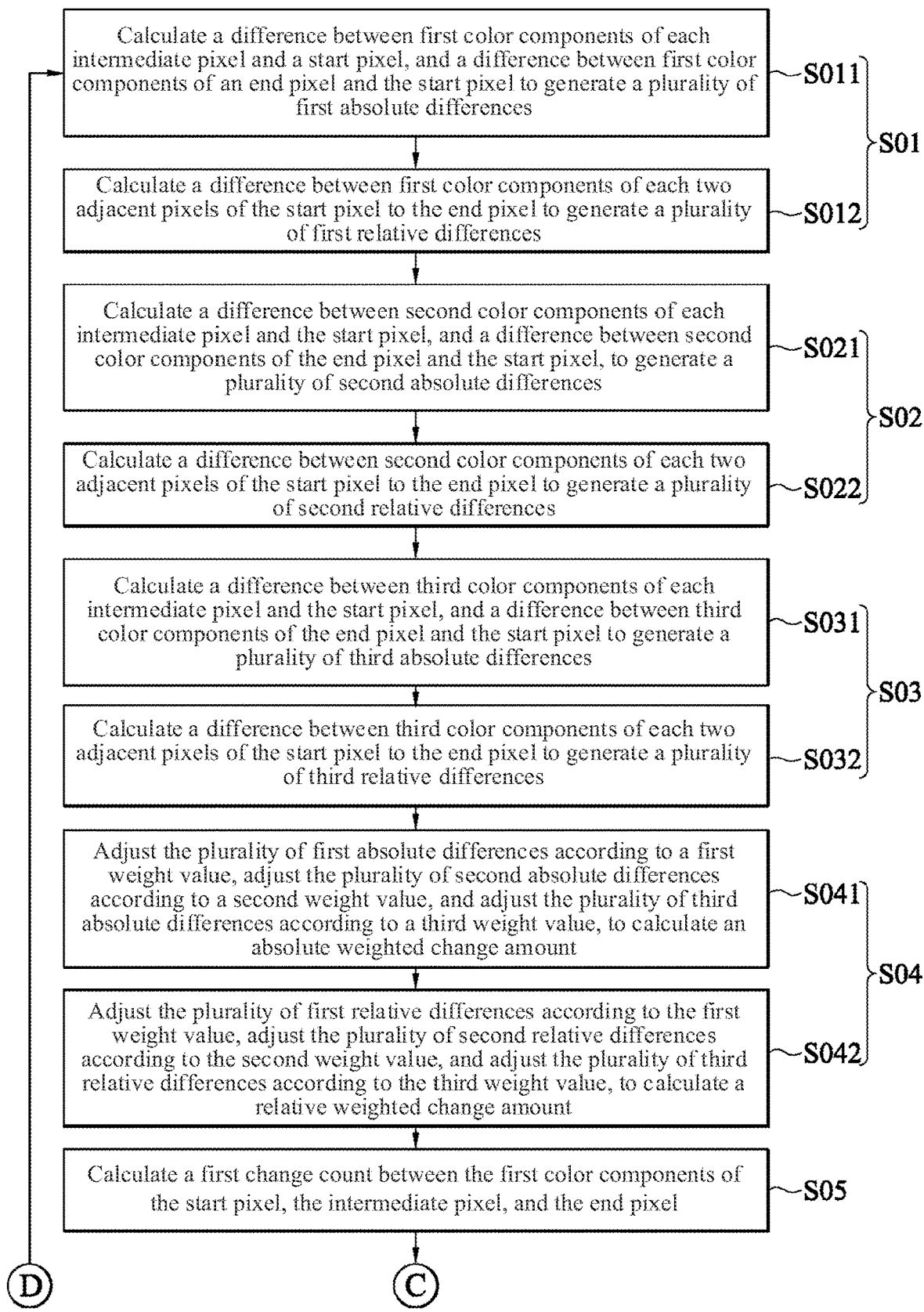
FIG. 6A and FIG. 6B are flowcharts of an embodiment of the debanding determination method for an image of FIG. 5A and FIG. 5B.

In some embodiments, as shown in FIG. 6A, in step S01, the first change amount calculated by the first operation circuit 11 includes a plurality of first absolute differences and a plurality of first relative differences. The first operation circuit 11 calculates differences between the first color component of each of the intermediate pixels P2 and the first color component of the start pixel P1, and a difference between the first color component of the end pixel P3 and the first color component of the start pixel P1 in order to generate the plurality of first absolute differences (step S011). In addition, the first operation circuit 11 calculates differences between the first color components of each two adjacent pixels from the start pixel P1 to the end pixel P3 to generate a plurality of first relative differences (step S012).

For example, in FIG. 3, the first absolute differences includes a difference dir_d1[1] between the first color components of an intermediate pixel P21 and the start pixel P1, a difference dir_d1[2] between the first color components of an intermediate pixel P22 and the start pixel P1, a difference dir_d1[3] between the first color components of an intermediate pixel P23 and the start pixel P1, and a difference dir_d1[4] between the first color components of the end pixel P3 and the start pixel P1. The first relative differences include a difference adj_d1[1] between the first color components of the intermediate pixel P21 and the intermediate pixel P22, a difference adj_d1[2] between the first color components of the intermediate pixel P22 and the intermediate pixel P23, and a difference adj_d1[3] between the first color components of the intermediate pixel P23 and the end pixel P3.

Similarly, for a second change amount between the second color components, in step S02, the second change amount calculated by the first operation circuit 11 includes a plurality of second absolute differences and a plurality of second relative differences. The first operation circuit 11 calculates differences between the second color components of the intermediate pixels P2 and the start pixel P1, and a difference between the second color components of the end pixel P3 and the start pixel P1 in order to generate a plurality of second absolute differences (step S021). In addition, the first operation circuit 11 calculates differences between the second color components of each two adjacent pixels from the start pixel P1 to the end pixel P3 to generate a plurality of second relative differences (step S022). For example, the plurality of second absolute differences include a difference dir_d2[1] between the second color components of the intermediate pixel P21 and the start pixel P1, a difference dir_d2[2] between the second color components of the intermediate pixel P22 and the start pixel P1, a difference dir_d2[3] between the second color components of the intermediate pixel P23 and the start pixel P1, and a difference dir_d2[4] between the second color components of the end pixel P3 and the start pixel P1. The second relative differences include a difference adj_d2[1] between the second color components of the intermediate pixel P21 and the intermediate pixel P22, a difference adj_d2[2] between the second color components of the intermediate pixel P22 and the intermediate pixel P23, and a difference adj_d2[3] between the second color components of the intermediate pixel P23 and the end pixel P3.

Similarly, for a third change amount between the second color components, in step S03, the third change amount calculated by the first operation circuit 11 includes a plurality of third absolute differences and a plurality of third relative differences. The first operation circuit 11 calculates differences between the third color components of the intermediate pixels P2 and the start pixel P1, and a difference between the third color components of the end pixel P3 and the start pixel P1 in order to generate a plurality of third absolute differences (step S031). In addition, the first operation circuit 11 calculates differences between the third color components of each two adjacent pixels from the start pixel P1 to the end pixel P3 to generate a plurality of third relative differences (step S032). For example, the plurality of third absolute differences include a difference dir_d3[1] between the third color components of the intermediate pixel P21 and the start pixel P1, a difference dir_d3[2] between the third color components of the intermediate pixel P22 and the start pixel P1, a difference dir_d3[3] between third color components of the intermediate pixel P23 and the start pixel P1, and a difference dir_d3[4] between the third color components of the end pixel P3 and the start pixel P1. The third relative differences include a difference adj_d3[1] between third color components of the intermediate pixel P21 and the intermediate pixel P22, a difference adj_d3[2] between the third color components of the intermediate pixel P22 and the intermediate pixel P23, and a difference adj_d3[3] between third color components of the intermediate pixel P23 and the end pixel P3.

If a total number of the intermediate pixels P2 and the end pixel P3 is n, absolute differences between the color components of $n^{th}$ pixels and the start pixel P1 may be respectively expressed by the following formulas:

$$\text{dir\_}d1[n]=\text{abs}(\text{pixel}_n-\text{pixel}_{P1}) \qquad \text{formula 1.1;}$$

$$\text{dir\_}d2[n]=\text{abs}(\text{pixel}_n-\text{pixel}_{P1}) \qquad \text{formula 1.2; and}$$

$$\text{dir\_}d3[n]=\text{abs}(\text{pixel}_n-\text{pixel}_{P1}) \qquad \text{formula 1.3.}$$

Relative differences between color components of adjacent $n^{th}$ pixels and $n-1^{th}$ pixels may be respectively expressed by the following formulas:

$$\text{adj\_}d1[n]=\text{abs}(\text{pixel}_n-\text{pixel}_{n-1}) \qquad \text{formula 1.4;}$$

$$\text{adj\_}d2[n]=\text{abs}(\text{pixel}_n-\text{pixel}_{n-1}) \qquad \text{formula 1.5;}$$

$$\text{adj\_}d3[n]=\text{abs}(\text{pixel}_n-\text{pixel}_{n-1}) \qquad \text{formula 1.6;}$$

In the foregoing, formulas 1.1 and 1.4 correspond to the first color components, formulas 1.2 and 1.5 correspond to the second color components, and formulas 1.3 and 1.6 correspond to the third color components.

In short, meanings of the two differences between single color components calculated by the first operation circuit 11 may be understood as follows: (1) the absolute difference: a difference between the color component of each pixel (in a direction extending from the start pixel P1 to the end pixel P3) and the color component of the start pixel P1; and (2) the relative difference: a difference between a color component of each pixel (in a direction extending from the start pixel P1 to the end pixel P3) and the color component corresponding to its adjacent pixel (the pixel next to it).

In some embodiments, as shown in FIG. 6A, in step S04, a weighted total change amount calculated by the second operation circuit 12 includes an absolute weighted change amount and a relative weighted change amount. The second operation circuit 12 adjusts the foregoing plurality of first absolute differences according to the first weight value, adjusts the foregoing plurality of second absolute differences according to the second weight value, and adjusts the foregoing plurality of third absolute differences according to the third weight value, in order to calculate the absolute weighted change amount (step S041). The second operation circuit 12 adjusts the foregoing plurality of first relative differences according to the first weight value, adjusts the foregoing plurality of second relative differences according to the second weight value, and adjusts the foregoing plurality of third relative differences according to the third weight value, in order to calculate the relative weighted change amount (step S042).

For example, in step S041, the second operation circuit 12 may respectively multiply the first weight values by dir_d1[n] (e.g., dir_d1[1], dir_d1[2], dir_d1[3], dir_d1[4]), and respectively multiply the second weight values by dir_d2[n], and respectively multiply the third weight values by dir_d3[n] and add resulting products to calculate the absolute weighted change amount. In step S042, the second operation circuit 12 may respectively multiply the first weight values by adj_d1[n] (e.g., adj_d1[1], adj_d1[2], adj_d1[3]), respectively multiply the second weight value by adj_d2[n], and respectively multiply the third weight value by adj_d3[n], and add resulting products to calculate the relative weighted change amount. The absolute weighted change amount and the relative weighted change amount may be respectively expressed by formula 2.1 and 2.2:

$$\text{dir\_}d1[n]*\text{wgt\_1}+\text{dir\_}d2[n]*\text{wgt\_2}+\text{dir\_}d3[n]*\text{wgt\_3} \quad \text{formula 2.1}$$

$$\text{adj\_}d1[n]*\text{wgt\_1}+\text{adj\_}d2[n]*\text{wgt\_2}+\text{adj\_}d3[n]*\text{wgt\_3} \quad \text{formula 2.2}$$

In the foregoing formula, wgt_1, wgt_2, and wgt_3 represent the first weight value, the second weight value, and the third weight value, respectively. Following the above description, in some embodiments, wgt_1 is greater than or equal to wgt_2, wgt_2 is greater than or equal to wgt_3, and a sum of wgt_2 and wgt_3 is greater than or equal to wgt_1.

In short, the second operation circuit 12 respectively calculates a sum of two weight differences of all three color components of each pixel according to the two differences calculated by the first operation circuit 11.

In some embodiments, in step S05, the third operation circuit 13 may determine whether the first color components between two adjacent pixels are the same, and hereby calculate a first change count indicating the times that the first color components from the start pixel P1 to the end pixel P3 have changed. For example, in FIG. 1, if the first color components of the start pixel P1, the intermediate pixels P21, P22, P23, and the end pixel P3 are shown in values 60, 60, 60, 61, 61 respectively, the third operation circuit 13 determines that the first change count is one (i.e., the values have changed from 60 to 61 once). If the first color components of the start pixel P1, the intermediate pixels P21, P22, P23, and the end pixel P3 are shown in values 60, 61, 60, 61, 60 respectively, the third operation circuit 13 determines that the first change count is four (i.e., the values have changed between 60 and 61 for four times).

Figure 6B:
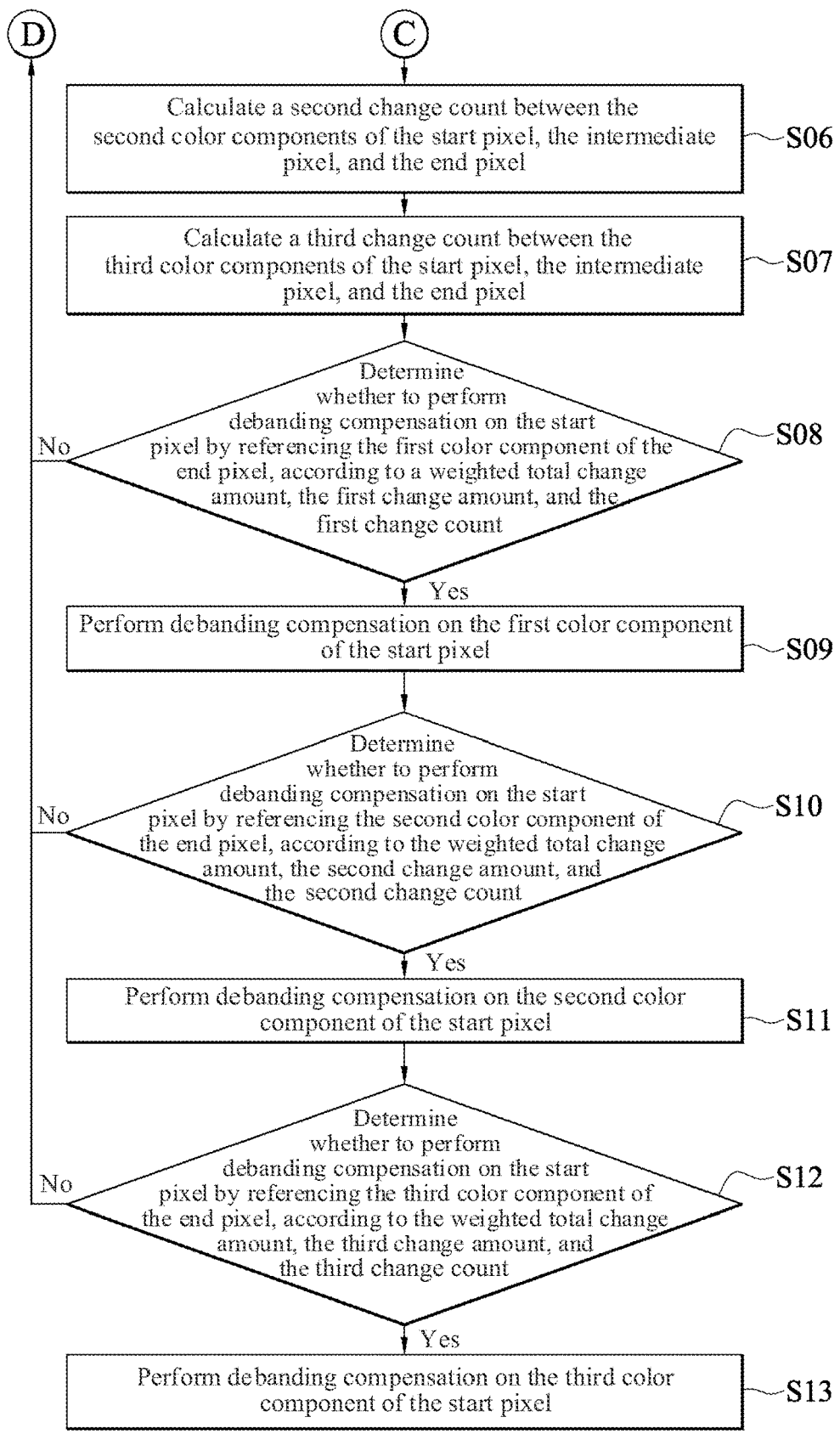

Similarly, as shown in FIG. 6B, in step S06, the third operation circuit 13 may determine whether the second color components between two adjacent pixels are the same, and hereby calculate a second change count between second color components from the start pixel P1 to the end pixel P3. In step S07, the third operation circuit 13 may determine whether the third color components between two adjacent pixels are the same, and hereby calculate a third change count between the third color components corresponding to each pair of adjacent pixels from the start pixel P1 to the end pixel P3.

Accordingly, for the first color components, in step S08, the processing circuit 14 determines whether each of the foregoing first absolute differences is less than a first value included in the first predetermined amount value, and the processing circuit 14 determines whether each of the foregoing first relative differences is less than a second value included in the first predetermined amount values (the foregoing two determination conditions are collectively referred to as the first criterion). The processing circuit 14 also determines whether the second value of the first predetermined amount value is less than or equal to the first value of the first predetermined amount value. For example, the processing circuit 14 determines whether each dir_d1[n] is less than the first value of the first predetermined amount value and determines whether each adj_d1[n] is less than the second value of the first predetermined amount value.

In addition, in step S08, the processing circuit 14 determines whether the foregoing absolute weighted change amount is less than a first value included in the predetermined weighted value, and the processing circuit 14 determines whether the foregoing relative weighted change amount is less than a second value included in the predetermined weighted value. When each of the first absolute differences is less than the first value of the first predetermined amount value, each of the first relative differences is less than the second value of the first predetermined amount value, the absolute weighted change amount is less than the first value of the predetermined weighted value, the relative weighted change amount is less than the second value of the predetermined weighted value, and the first change count is less than a predetermined value of the first change count, the processing circuit 14 generates the foregoing determination result S2 with "yes", so that the debanding circuit 15 may decide a specific end pixel P3 as a reference pixel to perform debanding compensation on the first color component of the start pixel P1 according to the end pixel P3 (step S09).

Accordingly, for the second color components, in step S10, the processing circuit 14 determines whether each of the foregoing second absolute differences is less than the first value included in the second predetermined amount value, and the processing circuit 14 determines whether each of the foregoing second relative differences is less than the second value included in the second predetermined amount value (the foregoing two determination conditions are collectively referred to as a second criterion below). The processing circuit 14 also determines whether the second value of the second predetermined amount value is less than or equal to the first value of the second predetermined amount value. For example, the processing circuit 14 determines whether each dir_d2[n] is less than the first value of the second predetermined amount value, and determines whether each adj_d2[n] is less than the second value of the second predetermined amount value.

In addition, in step S10, the processing circuit 14 determines whether the foregoing absolute weighted change amount is less than a first value included in the predetermined weighted value, and the processing circuit 14 determines whether the foregoing relative weighted change amount is less than a second value included in the predetermined weighted value. The second value of the predetermined weighted value is less than or equal to the first value of the predetermined weighted value. When each of the second absolute differences is less than the first value of the second predetermined amount value, each of the second relative differences is less than the second value of the second predetermined amount value, the absolute weighted change amount is less than the first value of the predetermined weighted value, the relative weighted change amount is less than the second value of the predetermined weighted value, and the second change count is less than a second predetermined change count value, the processing circuit 14 generates the foregoing determination result S2 with "yes", so that the debanding circuit 15 performs debanding compensation on the second color component of the start pixel Pb (step S11).

Similarly, for the third color components, in step S12, the processing circuit 14 determines whether each of the foregoing third absolute differences is less than a first value included in the third predetermined amount value, and the processing circuit 14 determines whether each of the foregoing third relative differences is less than a second value included in third predetermined amount value (the foregoing two determination conditions are collectively referred to as a third criterion below). The processing circuit 14 also determines whether the second value of the third predetermined amount value is less than or equal to the first value of the third predetermined amount value. For example, the processing circuit 14 determines whether each dir_d3[n] is less than the first value of the third predetermined amount value, and determines whether each adj_d3[n] is less than the second value of the third predetermined amount value.

In addition, in step S12, the processing circuit 14 determines whether the foregoing absolute weighted change amount is less than a first value included in the predetermined weighted value, and the processing circuit 14 determines whether the foregoing relative weighted change amount is less than a second value included in the predetermined weighted value. When each of the third absolute differences is less than the first value of the third predetermined amount value, each of the third relative differences is less than the second value of the third predetermined amount value, the absolute weighted change amount is less than the first value of the predetermined weighted value, the relative weighted change amount is less than the second value of the predetermined weighted value, and the third change count is less than a third predetermined change count value, the processing circuit 14 generates the foregoing determination result S2 with "yes", so that the debanding circuit 15 performs debanding compensation on the third color component of the start pixel P1 (step S13).

In some embodiments, the first predetermined amount value, the second predetermined amount value, and the third predetermined amount value may be the same or different. The first predetermined change count value, the second predetermined change count value, and the third predetermined change count value may be the same or different.

In some embodiments, as shown in FIG. 4, the processing circuit 14 may be implemented by a logic circuit of AND gate. Based on this, for the first color components, the first operation circuit 11 may perform step S011 and step S012 and then determine whether each of the first absolute differences is less than the first value of the first predetermined amount value and whether each of the first relative differences is less than the second value of the first predetermined amount value. In other words, the first operation circuit 11 determines whether the foregoing first criterion is established. When the first criterion is established, the first operation circuit 11 outputs a high-potential determination result S111. If any of the first absolute differences is not less than the first value of the first predetermined amount value or any of the first relative differences is not less than the second value of the first predetermined amount value, it indicates that the first criterion is not established, and the first operation circuit 11 may output a low-potential determination result S111. For example, the first value and the second value of the first predetermined amount value may be 4 and 2 respectively. When the first color components of the start pixel P1, the intermediate pixels P21, P22, P23, and the end pixel P3 are shown in values 60, 61, 62, 62, 63 (absolute differences between each pair of values: 1, 2, 2, 3, all of them are less than 4; relative differences between each pair of values: 1, 1, 0, 1, all of them are less than 2) respectively, the first operation circuit 11 may output a determination result S111 with a relatively high potential. When the first color components of the start pixel P1, the intermediate pixels P21, P22, P23, and the end pixel P3 are shown in values 60, 60, 60, 63, 63 (absolute differences between each pair of values: 0, 0, 3, 3, all of them are less than 4; relative differences between each pair of values: 0, 0, 3, 0, one of which is greater than 2), the first operation circuit 11 may output a determination result S111 with a relatively low potential.

Similarly, for the second color components, the first operation circuit 11 may perform step S021 and step S022 and then determine whether the second criterion is established, and output a determination result S112 with high or low potential. For the third color components, the first operation circuit 11 may perform step S031 and step S032 and then determine whether the third criterion is established, and output a determination result S113 with a high potential or a low potential, which are not repeated herein again.

The second operation circuit 12 may perform step S041 and step S042, and then determine whether the absolute weighted change amount is less than the first value of the predetermined weighted value and whether the relative weighted change amount is less than the second value of the predetermined weighted value. When the weighted change amount is less than the first value of the predetermined weighted value and the relative weighted change amount is less than the second value of the predetermined weighted value, the second operation circuit 12 may output a determination result S12 with a relatively high potential. When the weighted change amount is not less than the first value of the predetermined weighted value or the relative weighted change amount is not less than the second value of the predetermined weighted value, the second operation circuit 12 may output a determination result S12 with a relatively low potential.

The third operation circuit 13 may perform step S05 and then determine whether the first change count is less than a first predetermined change count value. When the first change count is less than the first predetermined change count value, the third operation circuit 13 may output a determination result S131 with a relatively high potential. When the first change count is not less than a first predetermined change count value, the third operation circuit 13 may output a determination result S131 with a relatively low potential. In addition, the third operation circuit 13 may perform step S06 and then determine whether the second change count is less than a second predetermined change count value to output a determination result S132 with a low potential. The third operation circuit 13 may perform step S07 and then determine whether the third change count is less than a third predetermined change count value to output a determination result S133 with a high potential or a low potential, which are not repeated herein again.

Therefore, in step S08, the processing circuit 14 may perform a logical operation of "AND" according to determination results S111, S112, S113, S12, and S13 to generate a determination result S2.

Figure 7:
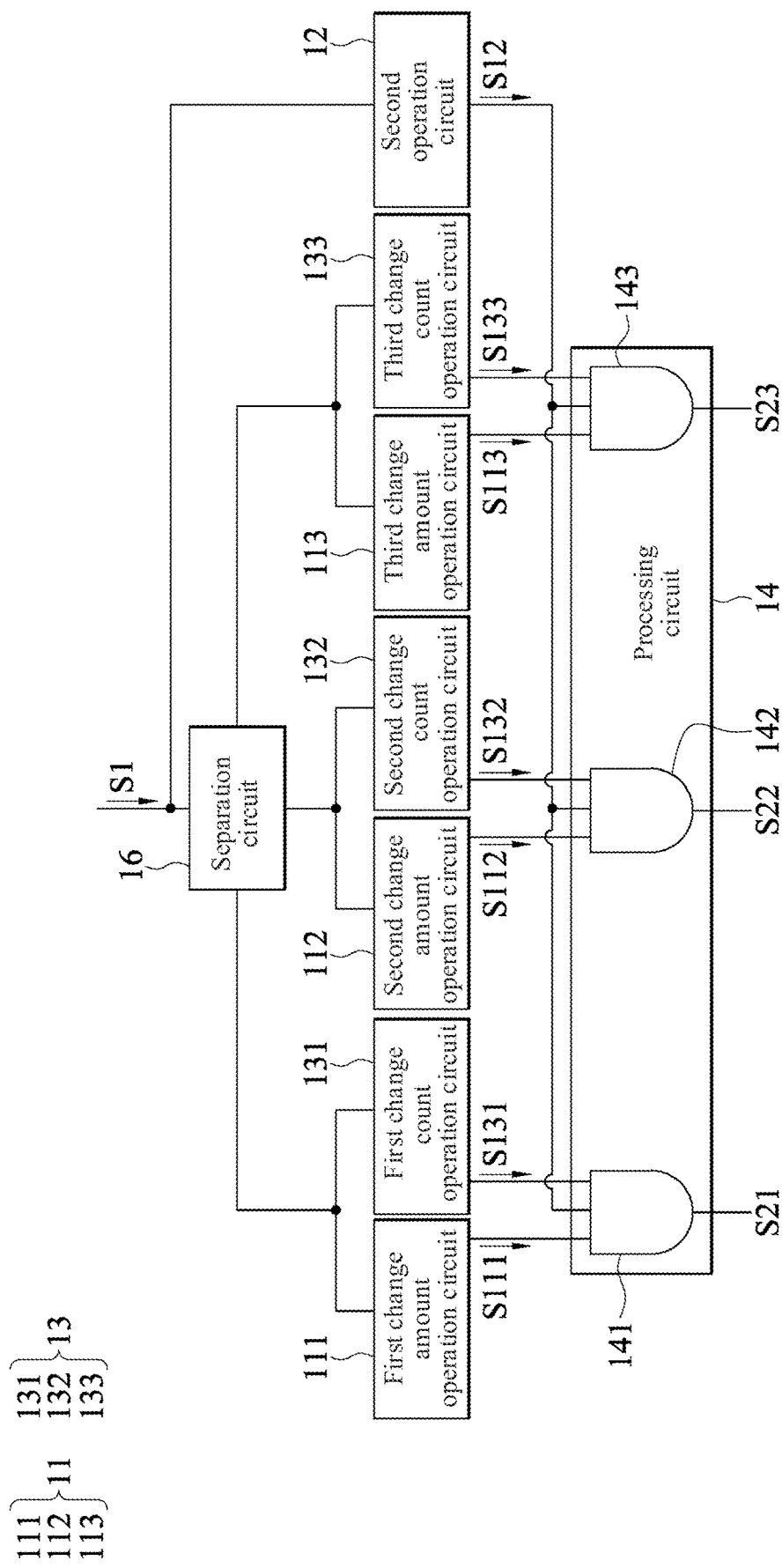
FIG. 7 is a circuit diagram of an embodiment of the debanding determination circuit for an image of FIG. 4.

In some embodiments, as shown in FIG. 7, for different first color components, second color components, and third color components, the debanding determination circuit 10 for an image may further include a separation circuit 16. The separation circuit 16 may separate different color components of an input image signal S1. The first operation circuit 11 may include a first change amount operation circuit 111, a second change amount operation circuit 112, and a third change amount operation circuit 113 all coupled to the separation circuit 16. The first change amount operation circuit 111, the second change amount operation circuit 112, and the third change amount operation circuit 113 may respectively receive the first color components, the second color components, and the third color components of the first pixel P1, the intermediate pixels P2, and the end pixel P3 from different output channels of the separation circuit 16 to generate determination results S111, S112, and S113 respectively. The third operation circuit may include a first change count operation circuit 131, a second change count operation circuit 132, and a third change count operation circuit 133 all coupled to the separation circuit 16. The first change count operation circuit 131, the second change count operation circuit 132, and the third change count operation circuit 133 may further respectively receive the first color components, the second color components, and the third color components of the start pixel P1, the intermediate pixels P2, and the end pixel P3 from different output channels of the separation circuit 16 to generate determination results S131, S132, and S133 respectively.

In other words, the debanding determination circuit 10 for an image may respectively find a specific pixel (i.e., the end pixel P3) as a reference pixel for debanding compensation, along a specific direction from the start pixel P1, with respect to the first color components, the second color components, and the third color components. In some embodiments, the debanding determination circuit 10 for an image may find different end pixels P3 as reference pixels with respect to the first color components, the second color components, and the third color components. In some embodiments, if it is failed to find an end pixel P3 that meets the conditions as a reference pixel along a specific direction from the start pixel P1 to an edge of the predetermined operation area A1, the debanding determination circuit 10 for an image may not perform debanding compensation on a specific color component along that direction (i.e., step S09, step S11, and step S13 are optional steps).

The processing circuit 14 may include a first AND gate 141, a second AND gate 142, and a third AND gate 143. The first AND gate 141 is coupled to the first change amount operation circuit 111, the first change count operation circuit 131, and the second operation circuit 12 to output a first result S21 included in the determination result S2 based on the determination results S111, S12, and S131,. The second AND gate 142 is coupled to the second change amount operation circuit 112, the second change count operation circuit 132, and the second operation circuit 12 to output a second result S22 included in the determination result S2 based on the determination results S112, S12, and S132. The third AND gate 143 is coupled to the third change amount operation circuit 113, the third change count operation circuit 133, and the second operation circuit 12 to output a third result S23 included in the determination result S2 based on the determination results S113, S12, and S133.

In some embodiments, the image processing device 1 may be a TV box coupled to a TV to perform debanding compensation on the input image signal S1 from an image signal source, and a user of the image processing device 1 may enjoy high-quality images while watching TV.

Based on the foregoing, according to an embodiment of the debanding determination method for an image and the image debanding determination circuit thereof of the present invention, the debanding determination circuit for an image may determine to perform debanding compensation on the central pixel based on a plurality of specific adjacent pixels of the central pixel in the predetermined operation area, to generate an image signal with good image quality by using a low operation capacity. In addition, the debanding determination circuit for an image further determines, based on the weighted total change amount of the three color components, whether the color components of the central pixel may find the end pixel P3 used as a reference pixel for debanding compensation in a selected range, to produce a more accurate determination result.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A debanding determination method for an image, adapted for an image processing device, the method comprising:
calculating a first change amount between first color components respectively corresponding to a start pixel, an end pixel, and at least one intermediate pixel in a plurality of pixels of the image, wherein the at least one intermediate pixel is located between the start pixel and the end pixel on the image;
calculating a second change amount between second color components respectively corresponding to the start pixel, the end pixel, and the at least one intermediate pixel;
calculating a third change amount between third color components respectively corresponding to the start pixel, the end pixel, and the at least one intermediate pixel;
adjusting the first change amount according to a first weight value corresponding to the first color component, adjusting the second change amount according to a second weight value corresponding to the second color component, and adjusting the third change amount according to a third weight value corresponding to the third color component, and calculating a weighted total change amount according to the adjusted first change amount, the adjusted second change amount, and the adjusted third change amount;
calculating a first change count between the first color components respectively corresponding to the start pixel, the end pixel, and the at least one intermediate pixel;
calculating a second change count between the second color components respectively corresponding to the start pixel, the end pixel, and the at least one intermediate pixel;
calculating a third change count between the third color components respectively corresponding to the start pixel, the end pixel, and the at least one intermediate pixel; and
determining whether to perform debanding compensation on the first color component, the second color component, or the third color component of the start pixel by using the end pixel as a reference pixel, according to the weighted total change amount, a predetermined weighted value corresponding to the weighted total change amount, the first change amount, a first predetermined amount value corresponding to the first change amount, the second change amount, a second predetermined amount value corresponding to the second change amount, the third change amount, a third predetermined amount value corresponding to the third change amount, the first change count, a first predetermined change count value corresponding to the first change count, the second change count, a second predetermined change count value corresponding to the second change count, the third change count, and a third predetermined change count value corresponding to the third change count, wherein
when the first color component corresponds to brightness or green, the second color component corresponds to red chroma or red, and the third color component corresponds to blue chroma or blue, the first weight value is greater than or equal to the second weight value, the second weight value is greater than or equal to the third weight value, and a sum of the second weight value and the third weight value is greater than or equal to the first weight value.

2. The debanding determination method for an image according to claim 1, further comprising:

when it is determined that the weighted total change amount is less than the predetermined weighted value, the first change amount is less than the first predetermined amount value, and the first change count is less than the first predetermined change count value, performing debanding compensation on the first color component of the start pixel by using the end pixel as the reference pixel;

when it is determined that the weighted total change amount is less than the predetermined weighted value, the second change amount is less than the second predetermined amount value, and the second change count is less than the second predetermined change count value, performing debanding compensation on the second color component of the start pixel by using the end pixel as the reference pixel; and when it is determined that the weighted total change amount is less than the predetermined weighted value, the third change amount is less than the third predetermined amount value, and the third change count is less than the third predetermined change count value, performing debanding compensation on the third color component of the start pixel by using the end pixel as the reference pixel.

3. The debanding determination method for an image according to claim 1, wherein the step of calculating the first change amount comprises:

calculating a difference between the first color components of the at least one intermediate pixel and the start pixel, and a difference between the first color components of the end pixel and the start pixel in order to calculate a plurality of first absolute differences comprised in the first change amount; and calculating a difference between the first color components respectively corresponding to each two adjacent pixels of the start pixel, the at least one intermediate pixel, and the end pixel in order to calculate a plurality of first relative differences comprised in the first change amount;

the step of calculating the second change amount comprises:

calculating a difference between the second color components of the at least one intermediate pixel and the start pixel, and a difference between the second color components of the end pixel and the start pixel in order to calculate a plurality of second absolute differences comprised in the second change amount; and calculating a difference between the second color components respectively corresponding to each two adjacent pixels of the start pixel, the at least one intermediate pixel, and the end pixel in order to calculate a plurality of second relative differences comprised in the second change amount; and the step of calculating the third change amount comprises:

calculating a difference between the third color components of the at least one intermediate pixel and the start pixel, and a difference between the third color components of the end pixel and the start pixel in order to calculate a plurality of third absolute differences comprised in the third change amount; and calculating a difference between the third color components respectively corresponding to each two adjacent pixels of the start pixel, the at least one intermediate pixel, and the end pixel in order to calculate a plurality of third relative differences comprised in the third change amount.

4. The debanding determination method for an image according to claim 3, wherein the step of calculating the weighted total change amount comprises:

adjusting the first absolute differences, the second absolute differences, and the third absolute differences according to the first weight value to calculate an absolute weighted change amount comprised in the weighted total change amount; and adjusting the first relative differences, the second relative differences, and the third relative differences according to the first weight value to calculate a relative weighted change amount comprised in the weighted total change amount.

5. The debanding determination method for an image according to claim 4, wherein the step of determining whether to perform debanding compensation on the first color component, the second color component, or the third color component of the start pixel by using the end pixel as a reference pixel comprises:

determining whether the absolute weighted change amount is less than a first value comprised in the predetermined weighted value, whether the relative weighted change amount is less than a second value comprised in the predetermined weighted value, whether each of the first absolute differences is less than a first value comprised in the first predetermined amount value, whether each of the first relative differences is less than a second value comprised in the first predetermined amount value, and whether the first change count is less than the first predetermined change count value, in order to determine whether to perform debanding compensation on the first color component of the start pixel by using the end pixel as the reference pixel, wherein the second value of the first predetermined amount value is less than or equal to the first value of the first predetermined amount value, and the second value of the predetermined weighted value is less than or equal to the first value of the predetermined weighted value;

determining whether the absolute weighted change amount is less than the first value comprised in the predetermined weighted value, whether the relative weighted change amount is less than the second value comprised in the predetermined weighted value, whether each of the second absolute differences is less than a first value comprised in the second predetermined amount value, whether each of the second relative differences is less than a second value comprised in the second predetermined amount value, and whether the second change count is less than the second predetermined change count value, in order to determine whether to perform debanding compensation on the second color component of the start pixel by using the end pixel as the reference pixel, wherein the second value of the second predetermined amount value is less than or equal to the first value of the second predetermined amount value; and determining whether the absolute weighted change amount is less than the first value comprised in the predetermined weighted value, whether the relative weighted change amount is less than the second value comprised in the predetermined weighted value, whether each of the first absolute differences is less than a first value comprised in the third predetermined amount value, whether each of the third relative differences is less than a second value comprised in the third predetermined amount value, and whether the third change count is less than the third predetermined change count value, in order to determine whether to perform debanding compensation on the third color component of the start pixel by using the end pixel as the reference pixel, wherein the second value of the third predetermined amount value is less than or equal to the first value of the third predetermined amount value.

6. The debanding determination method for an image according to claim 1, wherein the step of calculating the first change count comprises:

determining whether the first color components respectively corresponding to each two adjacent pixels of the start pixel, the at least one intermediate pixel, and the end pixel are the same, to calculate the first change count;

the step of calculating the second change count comprises:

determining whether the second color components respectively corresponding to each two adjacent pixels of the start pixel, the at least one intermediate pixel, and the end pixel are the same, to calculate the second change count; and the step of calculating the third change count comprises:

determining whether the third color components respectively corresponding to each two adjacent pixels of the start pixel, the at least one intermediate pixel, and the end pixel are the same, to calculate the third change count.

7. The debanding determination method for an image according to claim 1, wherein the image comprises a plurality of predetermined operation areas, and the start pixel, the end pixel, and the at least one intermediate pixel are located in a first predetermined operation area in the predetermined operation areas, and after it is determined whether to perform debanding compensation on the first color component, the second color component, and the third color component of the start pixel of the first predetermined operation area by referencing the first color component, the second color component, and the third color component of the end pixel, the debanding determination method for an image further comprises:

determining, according to another start pixel, another end pixel, and another intermediate pixel of a second predetermined operation area in the predetermined operation areas, whether to perform debanding compensation on the another start pixel by referencing another first color component, another second color component, and another third color component of the another end pixel.

8. The debanding determination method for an image according to claim 1, wherein the image comprises a plurality of predetermined operation areas, the start pixel, the end pixel, and the at least one intermediate pixel are located in a first predetermined operation area in the predetermined operation areas, and the start pixel is a pixel at a center of the first predetermined operation area.

9. The debanding determination method for an image according to claim 8, wherein there is an included angle between a virtual straight line passing through the start pixel and the end pixel and a horizontal direction extending from the start pixel, and the virtual straight line passes through the intermediate pixel.

10. A debanding determination circuit for an image, comprising:

a first operation circuit configured to calculate a first change amount between first color components respectively corresponding to a start pixel, an end pixel, and at least one intermediate pixel in a plurality of pixels of the image, calculate a second change amount between second color components respectively corresponding to the start pixel, the end pixel, and the at least one intermediate pixel, and calculate a third change amount between third color components respectively corresponding to the start pixel, the end pixel, and the at least one intermediate pixel, wherein the at least one intermediate pixel is located between the start pixel and the end pixel on the image;

a second operation circuit configured to adjust the first change amount according to a first weight value corresponding to the first color component, adjust the second change amount according to a second weight value corresponding to the second color component, and adjust the third change amount according to a third weight value corresponding to the third color component, to calculate a weighted total change amount according to the adjusted first change amount, the adjusted second change amount, and the adjusted third change amount, wherein when the first color component corresponds to brightness or green, the second color component corresponds to red chroma or red, and the third color component corresponds to blue chroma or blue, the first weight is greater than or equal to the second weight, the second weight is greater than or equal to the third weight, and a sum of the second weight and the third weight is greater than or equal to the first weight;

a third operation circuit configured to calculate a first change count between the first color components respectively corresponding to the start pixel, the end pixel, and the at least one intermediate pixel, calculate a second change count between the second color components respectively corresponding to the start pixel, the end pixel, and the at least one intermediate pixel, and calculate a third change count between the third color components respectively corresponding to the start pixel, the end pixel, and the at least one intermediate pixel; and a processing circuit coupled to the first operation circuit, the second operation circuit, and the third operation circuit and configured to determine whether to perform debanding compensation on the first color component, the second color component, or the third color component of the start pixel by using the end pixel as a reference pixel, according to the weighted total change amount, a predetermined weighted value corresponding to the weighted total change amount, the first change amount, a first predetermined amount value corresponding to the first change amount, the second change amount, a second predetermined amount value corresponding to the second change amount, the third change amount, a third predetermined amount value corresponding to the third change amount, the first change count, a first predetermined change count value corresponding to the first change count, the second change count, a second predetermined change count value corresponding to the second change count, the third change count, and a third predetermined change count value corresponding to the third change count.

11. The debanding determination circuit for an image according to claim 10, wherein when the processing circuit determines that the weighted total change amount is less than the predetermined weighted value, the first change amount is less than the first predetermined amount value, and the first change count is less than the first predetermined change count value, the processing circuit determines to perform debanding compensation on the first color component of the start pixel by using the end pixel as the reference pixel; when the weighted total change amount is less than the predetermined weighted value, the second change amount is less than the second predetermined amount value, and the second change count is less than the second predetermined change count value, the processing circuit determines to perform debanding compensation on the second color component of the start pixel by using the end pixel as the reference pixel; and when the weighted total change amount is less than the predetermined weighted value, the third change amount is less than the third predetermined amount value, and the third change count is less than the third predetermined change count value, the processing circuit determines to perform debanding compensation on the third color component of the start pixel by using the end pixel as the reference pixel.

12. The debanding determination circuit for an image according to claim 10, wherein the first change amount comprises a plurality of first absolute differences and a plurality of first relative differences, the first operation circuit calculates a difference between the first color components of the at least one intermediate pixel and the start pixel, and a difference between the first color components of the end pixel and the start pixel in order to calculate the first absolute differences, and the first operation circuit calculates a difference between the first color components respectively corresponding to each two adjacent pixels of the start pixel, the at least one intermediate pixel, and the end pixel in order to calculate the first relative differences;
the second change amount comprises a plurality of second absolute differences and a plurality of second relative differences, the first operation circuit calculates a difference between the second color components of the at least one intermediate pixel and the start pixel, and a difference between the second color components of the end pixel and the start pixel in order to calculate the second absolute differences, and the first operation circuit calculates a difference between the second color components respectively corresponding to each two adjacent pixels of the start pixel, the at least one intermediate pixel, and the end pixel in order to calculate the second relative differences; and
the third change amount comprises a plurality of third absolute differences and a plurality of third relative differences, the first operation circuit calculates a difference between the third color components of the at least one intermediate pixel and the start pixel, and a difference between the third color components of the end pixel and the start pixel in order to calculate the third absolute differences, and the first operation circuit calculates a difference between the third color components respectively corresponding to each two adjacent pixels of the start pixel, the at least one intermediate pixel, and the end pixel in order to calculate the third relative differences.

13. The debanding determination circuit for an image according to claim 12, wherein the weighted total change amount comprises an absolute weighted change amount and a relative weighted change amount, the second operation circuit adjusts the first absolute differences, the second absolute differences, and the third absolute differences according to the first weight value to calculate the absolute weighted change amount, and the second operation circuit adjusts the first relative differences, the second relative differences, and the third relative differences according to the first weight value to calculate the relative weighted change amount.

14. The debanding determination circuit for an image according to claim 13, wherein the processing circuit determines whether the absolute weighted change amount is less than a first value comprised in the predetermined weighted value, whether the relative weighted change amount is less than a second value comprised in the predetermined weighted value, whether each of the first absolute differences is less than a first value comprised in the first predetermined amount value, whether each of the first relative differences is less than a second value comprised in the first predetermined amount value, and whether the first change count is less than the first predetermined change count value, in order to determine whether it is necessary to perform debanding compensation on the first color component of the start pixel by using the end pixel as the reference pixel, wherein the second value of the first predetermined amount value is less than or equal to the first value of the first predetermined amount value, and the second value of the predetermined weighted value is less than or equal to the first value of the predetermined weighted value;
the processing circuit determines whether the absolute weighted change amount is less than the first value comprised in the predetermined weighted value, whether the relative weighted change amount is less than the second value comprised in the predetermined weighted value, and whether each of the second absolute differences is less than a first value comprised in the second predetermined amount value, whether each of the second relative differences is less than a second value comprised in the second predetermined amount value, and whether the second change count is less than the second predetermined change count value, in order to determine whether to perform debanding compensation on the second color component of the start pixel by using the end pixel as the reference pixel, wherein the second value of the second predetermined amount value is less than or equal to the first value of the second predetermined amount value; and
the processing circuit determines whether the absolute weighted change amount is less than the first value comprised in the predetermined weighted value, whether the relative weighted change amount is less than the second value comprised in the predetermined weighted value, whether each of the first absolute differences is less than a first value comprised in the third predetermined amount value, whether each of the third relative differences is less than a second value comprised in the third predetermined amount value, and whether the third change count is less than the third predetermined change count value, in order to determine whether to perform debanding compensation on the third color component of the start pixel by using the end pixel as the reference pixel, wherein the second value of the third predetermined amount value is less than or equal to the first value of the third predetermined amount value.

15. The debanding determination circuit for an image according to claim 10, wherein the third operation circuit determines whether the first color components respectively corresponding to each two adjacent pixels of the start pixel, the at least one intermediate pixel, and the end pixel are the same, to calculate the first change count, the third operation circuit determines whether the second color components respectively corresponding to each two adjacent pixels of the start pixel, the at least one intermediate pixel, and the end pixel are the same, to calculate the second change count and the third operation circuit determines whether the third color components respectively corresponding to each two adjacent pixels of the start pixel, the at least one intermediate pixel, and the end pixel are the same, to calculate the third change count.

16. The debanding determination circuit for an image according to claim 10, wherein the image comprises a plurality of predetermined operation areas, and the start pixel, the end pixel, and the at least one intermediate pixel are located in a first predetermined operation area in the predetermined operation areas, and after the processing circuit determines whether to perform debanding compensation on the first color component, the second color component, and the third color component of the start pixel of the first predetermined operation area by referencing the first color component, the second color component, and the third color component of the end pixel, the processing circuit further determines, according to another start pixel, another end pixel, and another intermediate pixel of a second predetermined operation area in the predetermined operation areas, to perform debanding compensation on the another start pixel by referencing another first color component, another second color component, and another third color component of the another end pixel.

17. The debanding determination circuit for an image according to claim 10, wherein the image comprises a plurality of predetermined operation areas, the start pixel, the end pixel, and the intermediate pixel are located in a first predetermined operation area, and the start pixel is a pixel at a center of the first predetermined operation area.

18. The debanding determination circuit for an image according to claim 17, wherein there is an included angle between a virtual straight line passing through the start pixel and the end pixel and a horizontal direction extending from the start pixel and the virtual straight line passes through the intermediate pixel.

* * * * *